United States Patent
Nanri

(10) Patent No.: US 10,123,233 B2
(45) Date of Patent: Nov. 6, 2018

(54) BASE STATION APPARATUS AND COMMUNICATION SYSTEM

(71) Applicant: SoftBank Corp., Tokyo (JP)

(72) Inventor: Masahiko Nanri, Tokyo (JP)

(73) Assignee: Softbank Corp., Tokyo (JP)

( * ) Notice: Subject to any disclaimer, the term of this patent is extended or adjusted under 35 U.S.C. 154(b) by 193 days.

(21) Appl. No.: 15/026,701

(22) PCT Filed: Jan. 18, 2016

(86) PCT No.: PCT/JP2016/051313
§ 371 (c)(1),
(2) Date: Apr. 1, 2016

(87) PCT Pub. No.: WO2017/126013
PCT Pub. Date: Jul. 27, 2017

(65) Prior Publication Data
US 2018/0054757 A1 Feb. 22, 2018

(51) Int. Cl.
*H04W 28/06* (2009.01)
*H04W 28/10* (2009.01)
(Continued)

(52) U.S. Cl.
CPC ............ *H04W 28/06* (2013.01); *H04L 1/00* (2013.01); *H04L 5/00* (2013.01); *H04W 28/10* (2013.01); *H04W 28/18* (2013.01); *H04W 28/22* (2013.01); *H04W 24/10* (2013.01); *H04W 72/1257* (2013.01); *H04W 92/045* (2013.01)

(58) Field of Classification Search
CPC ...... H04W 28/06; H04W 28/10; H04W 28/18
See application file for complete search history.

(56) References Cited

U.S. PATENT DOCUMENTS 8,112,115 B2   2/2012  Natsuno et al.
8,310,929 B1 * 11/2012  Srinivas ............ H04W 28/0247
                                                    370/232
(Continued)

FOREIGN PATENT DOCUMENTS

JP    2006-93778 A    4/2006
JP    2007-259289 A   10/2007
(Continued)

*Primary Examiner* — Derrick W Ferris
*Assistant Examiner* — Kevin H Lee
(74) *Attorney, Agent, or Firm* — Muirhead and Saturnelli, LLC

(57) ABSTRACT

A base station apparatus and a communication system, witch are capable of optimizing a radio transmission path between a mobile station and a base station according to a communication speed of a backhaul link, are provided. The base station apparatus capable of communicating with a mobile station via a radio transmission path comprises information acquisition means of acquiring information on a communication speed of a backhaul link, and parameter adjustment means of adjusting communication parameters of the radio transmission path so that a communication speed of the radio transmission path becomes equal to or lower than the communication speed of the backhaul link, based on the information on communication speed of the backhaul link and a channel bandwidth of the radio transmission path.

9 Claims, 14 Drawing Sheets

(51) Int. Cl.
  *H04W 28/18*   (2009.01)
  *H04L 1/00*    (2006.01)
  *H04L 5/00*    (2006.01)
  *H04W 28/22*   (2009.01)
  *H04W 24/10*   (2009.01)
  *H04W 72/12*   (2009.01)
  *H04W 92/04*   (2009.01)

(56) References Cited

U.S. PATENT DOCUMENTS

| | | | |
|---|---|---|---|
| 8,699,423 B1* | 4/2014 | Anderson | H04L 1/0006 |
| | | | 370/310 |
| 9,125,080 B2 | 9/2015 | Kubota | |
| 2009/0213825 A1 | 8/2009 | Gupta et al. | |
| 2011/0059691 A1 | 3/2011 | Hegge | |
| 2011/0085508 A1* | 4/2011 | Wengerter | H04L 5/0094 |
| | | | 370/329 |
| 2012/0100854 A1 | 4/2012 | Hanaoka | |
| 2012/0238263 A1* | 9/2012 | Caretti | H04W 16/10 |
| | | | 455/426.1 |
| 2014/0269409 A1* | 9/2014 | Dimou | B23K 10/003 |
| | | | 370/254 |
| 2015/0271802 A1* | 9/2015 | Kang | H04L 5/0092 |
| | | | 370/329 |
| 2016/0094310 A1* | 3/2016 | Xia | H04L 1/0003 |
| | | | 370/329 |

FOREIGN PATENT DOCUMENTS

| | | |
|---|---|---|
| JP | 2011-61464 A | 3/2011 |
| JP | 2011-061464 A | 3/2011 |
| JP | 2011-514758 A | 5/2011 |
| JP | 2014-192787 A | 10/2014 |
| JP | 2014-230131 A | 12/2014 |
| JP | 2015-514758 A | 5/2015 |
| WO | WO 2010/134202 A1 | 11/2010 |
| WO | WO 2011/096315 A1 | 8/2011 |

* cited by examiner

| MCS Index | Modulation System | TBS Index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | 16QAM | 9 |
| 11 | 16QAM | 10 |
| 12 | 16QAM | 11 |
| 13 | 16QAM | 12 |
| 14 | 16QAM | 13 |
| 15 | 16QAM | 14 |
| 16 | 16QAM | 15 |
| 17 | 64QAM | 15 |
| 18 | 64QAM | 16 |
| 19 | 64QAM | 17 |
| 20 | 64QAM | 18 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |
| 29 | QPSK | reserved |
| 30 | 16QAM | |
| 31 | 64QAM | |

| TBS Index | The Number of PRBs | | | | | |
|---|---|---|---|---|---|---|
| | 1 | 2 | 3 | 4 | 5 | ... |
| 0 | 16 | 32 | 56 | | 120 | ... |
| 1 | 24 | 56 | 88 | | 176 | ... |
| 2 | 32 | 72 | 144 | | 208 | ... |
| 3 | 40 | 104 | 176 | | 256 | ... |
| 4 | 56 | 120 | 208 | | 328 | ... |
| 5 | 72 | 144 | 224 | | 424 | ... |
| 6 | 328 | 176 | 256 | | 504 | ... |
| 7 | 104 | 224 | 328 | | 584 | ... |
| 8 | 120 | 256 | 392 | | 680 | ... |
| 9 | 136 | 296 | 456 | | 776 | ... |
| 10 | 144 | 328 | 504 | | 872 | ... |
| 11 | 176 | 376 | 584 | | 1000 | ... |
| 12 | 208 | 440 | 680 | | 1128 | ... |
| 13 | | | | 1000 | 1256 | ... |
| 14 | 256 | 552 | 840 | 1128 | 1416 | ... |
| 15 | 280 | 600 | 904 | 1224 | 1544 | ... |
| 16 | 328 | 632 | 968 | 1288 | 1608 | ... |
| 17 | 336 | 696 | 1064 | 1416 | 1800 | ... |
| 18 | 376 | 776 | 1160 | 1544 | 1992 | ... |
| 19 | 408 | 840 | 1288 | 1736 | 2152 | ... |
| 20 | 440 | 904 | 1384 | 1864 | 2344 | ... |
| 21 | 488 | 1000 | 1480 | 1992 | 2472 | ... |
| 22 | 520 | 1064 | 1608 | 2152 | 2664 | ... |
| 23 | 552 | 1128 | 1736 | 2280 | 2856 | ... |
| 24 | 584 | 1192 | 1800 | 2408 | 2984 | ... |
| 25 | 616 | 1256 | 1864 | 2536 | 3112 | ... |
| 26 | 712 | 1480 | 2216 | 2984 | 3752 | ... |

| MCS Index | Modulation System | TBS Index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | 16QAM | 10 |
| 12 | 16QAM | 11 |
| 13 | 16QAM | 12 |
| 14 | 16QAM | 13 |
| 15 | 16QAM | 14 |
| 16 | 16QAM | 15 |
| 17 | 16QAM | 16 |
| 18 | 16QAM | 17 |
| 19 | 16QAM | 18 |
| 20 | 16QAM | 19 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |

| TBS Index | The Number of PRBs | | | | | |
|---|---|---|---|---|---|---|
| | 1 | 2 | 3 | 4 | 5 | ... |
| 0 | 16 | 32 | 56 | 88 | 120 | ... |
| 1 | 24 | 56 | 88 | 144 | 176 | ... |
| 2 | 32 | 72 | 144 | 176 | 208 | ... |
| 3 | 40 | 104 | 176 | 208 | 256 | ... |
| 4 | 56 | 120 | 208 | 256 | 328 | ... |
| 5 | 72 | 144 | 224 | 328 | 424 | ... |
| 6 | 328 | 176 | 256 | 392 | 504 | ... |
| 7 | | | | 472 | 584 | ... |
| 8 | 120 | 256 | 392 | 536 | 680 | ... |
| 9 | 136 | 296 | 456 | 616 | 776 | ... |
| 10 | 144 | 328 | 504 | 680 | 872 | ... |
| 11 | 176 | 376 | 584 | 776 | 1000 | ... |
| 12 | 208 | 440 | 680 | 904 | 1128 | ... |
| 13 | 224 | 488 | 744 | 1000 | 1256 | ... |
| 14 | 256 | 552 | 840 | 1128 | 1416 | ... |
| 15 | 280 | 600 | 904 | 1224 | 1544 | ... |
| 16 | 328 | 632 | 968 | 1288 | 1608 | ... |
| 17 | 336 | 696 | 1064 | 1416 | 1800 | ... |
| 18 | 376 | 776 | 1160 | 1544 | 1992 | ... |
| 19 | 408 | 840 | 1288 | 1736 | 2152 | ... |
| 20 | 440 | 904 | 1384 | 1864 | 2344 | ... |
| 21 | 488 | 1000 | 1480 | 1992 | 2472 | ... |
| 22 | 520 | 1064 | 1608 | 2152 | 2664 | ... |
| 23 | 552 | 1128 | 1736 | 2280 | 2856 | ... |
| 24 | 584 | 1192 | 1800 | 2408 | 2984 | ... |
| 25 | 616 | 1256 | 1864 | 2536 | 3112 | ... |
| 26 | 712 | 1480 | 2216 | 2984 | 3752 | ... |

FIG. 9

| CQI Index | Modulation System | Code Rate x 1024 | Efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 12A

| MCS Index | Modulation System | TBS Index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | 16QAM | 9 |
| 11 | 16QAM | 10 |
| 12 | 16QAM | 11 |
| 13 | 16QAM | 12 |
| 14 | 16QAM | 13 |
| 15 | 16QAM | 14 |
| 16 | 16QAM | 15 |
| 17 | 64QAM | 15 |
| 18 | 64QAM | 16 |
| 19 | 64QAM | 17 |
| 20 | 64QAM | 18 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |
| 29 | QPSK | reserved |
| 30 | 16QAM | |
| 31 | 64QAM | |

FIG. 12B

| Channel Bandwidth [MHz] | RBG Size [PRB] |
|---|---|
| 5 | 2 |
| 10 | 3 |
| 15 | 4 |
| 20 | 4 |

FIG. 12D

| TBS Index | The Number of PRBs | | | | | |
|---|---|---|---|---|---|---|
| | 1 | 2 | 3 | 4 | 5 | ... |
| 0 | 16 | 32 | 56 | 88 | 120 | ... |
| 1 | 24 | 56 | 88 | 144 | 176 | ... |
| 2 | 32 | 72 | 144 | 176 | 208 | ... |
| 3 | 40 | 104 | 176 | 208 | 256 | ... |
| 4 | 56 | 120 | 208 | 256 | 328 | ... |
| 5 | 72 | 144 | 224 | 328 | 424 | ... |
| 6 | 328 | 176 | 256 | 392 | 504 | ... |
| 7 | 104 | 224 | 328 | 472 | 584 | ... |
| 8 | 120 | 256 | 392 | 536 | 680 | ... |
| 9 | 136 | 296 | 456 | 616 | 776 | ... |
| 10 | 144 | 328 | 504 | 680 | 872 | ... |
| 11 | 176 | 376 | 584 | 776 | 1000 | ... |
| 12 | 208 | 440 | 680 | 904 | 1128 | ... |
| 13 | 224 | 488 | 744 | 1000 | 1256 | ... |
| 14 | 256 | 552 | 840 | 1128 | 1416 | ... |
| 15 | 280 | 600 | 904 | 1224 | 1544 | ... |
| 16 | 328 | 632 | 968 | 1288 | 1608 | ... |
| 17 | 336 | 696 | 1064 | 1416 | 1800 | ... |
| 18 | 376 | 776 | 1160 | 1544 | 1992 | ... |
| 19 | 408 | 840 | 1288 | 1736 | 2152 | ... |
| 20 | 440 | 904 | 1384 | 1864 | 2344 | ... |
| 21 | 488 | 1000 | 1480 | 1992 | 2472 | ... |
| 22 | 520 | 1064 | 1608 | 2152 | 2664 | ... |
| 23 | 552 | 1128 | 1736 | 2280 | 2856 | ... |
| 24 | 584 | 1192 | 1800 | 2408 | 2984 | ... |
| 25 | 616 | 1256 | 1864 | 2536 | 3112 | ... |
| 26 | 712 | 1480 | 2216 | 2984 | 3752 | ... |

FIG. 12C

| MCS Index | Modulation System | TBS Index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | 16QAM | 10 |
| 12 | 16QAM | 11 |
| 13 | 16QAM | 12 |
| 14 | 16QAM | 13 |
| 15 | 16QAM | 14 |
| 16 | 16QAM | 15 |
| 17 | 16QAM | 16 |
| 18 | 16QAM | 17 |
| 19 | 16QAM | 18 |
| 20 | 16QAM | 19 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |

FIG. 12E

| TBS Index | The Number of PRBs | | | | | |
|---|---|---|---|---|---|---|
| | 1 | 2 | 3 | 4 | 5 | ... |
| 0 | 16 | 32 | 56 | 88 | 120 | ... |
| 1 | 24 | 56 | 88 | 144 | 176 | ... |
| 2 | 32 | 72 | 144 | 176 | 208 | ... |
| 3 | 40 | 104 | 176 | 208 | 256 | ... |
| 4 | 56 | 120 | 208 | 256 | 328 | ... |
| 5 | 72 | 144 | 224 | 328 | 424 | ... |
| 6 | 328 | 176 | 256 | 392 | 504 | ... |
| 7 | 104 | 224 | 328 | 472 | 584 | ... |
| 8 | 120 | 256 | 392 | 536 | 680 | ... |
| 9 | 136 | 296 | 456 | 616 | 776 | ... |
| 10 | 144 | 328 | 504 | 680 | 872 | ... |
| 11 | 176 | 376 | 584 | 776 | 1000 | ... |
| 12 | 208 | 440 | 680 | 904 | 1128 | ... |
| 13 | 224 | 488 | 744 | 1000 | 1256 | ... |
| 14 | 256 | 552 | 840 | 1128 | 1416 | ... |
| 15 | 280 | 600 | 904 | 1224 | 1544 | ... |
| 16 | 328 | 632 | 968 | 1288 | 1608 | ... |
| 17 | 336 | 696 | 1064 | 1416 | 1800 | ... |
| 18 | 376 | 776 | 1160 | 1544 | 1992 | ... |
| 19 | 408 | 840 | 1288 | 1736 | 2152 | ... |
| 20 | 440 | 904 | 1384 | 1864 | 2344 | ... |
| 21 | 488 | 1000 | 1480 | 1992 | 2472 | ... |
| 22 | 520 | 1064 | 1608 | 2152 | 2664 | ... |
| 23 | 552 | 1128 | 1736 | 2280 | 2856 | ... |
| 24 | 584 | 1192 | 1800 | 2408 | 2984 | ... |
| 25 | 616 | 1256 | 1864 | 2536 | 3112 | ... |
| 26 | 712 | 1480 | 2216 | 2984 | 3752 | ... |

FIG. 12F

BASE STATION APPARATUS AND COMMUNICATION SYSTEM

TECHNICAL FIELD

The present invention relates to a base station apparatus capable of communicating with a mobile station via a radio transmission path and a communication system including the base station apparatus.

BACKGROUND ART

A demand for a small base station (for example, see Patent Literatures 1 and 2) having a cell (radio communication area) smaller than a cell of previous macro-base station or a pico-base station is increasing, in order to cope with a recent rapidly-increasing traffic in a mobile communication system.

CITATION LIST

Patent Literature

Patent Literature 1: Japanese Unexamined Patent Application Publication No. 2006-093778.
Patent Literature 2: Japanese Unexamined Patent Application Publication No. 2007-259289.

SUMMARY OF INVENTION

Technical Problem

FIGS. 10 and 11 are illustrations showing a schematic configuration of a communication system having a small base station, according to an embodiment of the conventional examples, respectively. As shown in FIGS. 10 and 11, a small base station 20 is capable of communicating in both directions with mobile equipment 10 being as a mobile station via a radio transmission path 22. Furthermore, the small base station 20 is capable of communicating with a various types of core-network apparatuses 40 located in a core-network via a backhaul link 26, a router 24 and the Internet 30.

In the communication system in FIG. 10, in case of performing a downlink (DL) data communication toward the mobile equipment 10, a communication speed (throughput) of the backhaul link 26 is, for example, 100 Mbps, which is higher than a downlink (DL) communication speed (for example, 75 Mbps) in the radio transmission path 22. In case of performing an uplink (UL) data communication from the mobile equipment 10, a communication speed of the backhaul link 26 is, for example, 50 Mbps, which is higher than a downlink communication speed (for example 37 Mbps) in the radio transmission path 22. In both cases of downlink and uplink, since the communication speed of the backhaul link 26 is higher than the communication speed of the radio transmission path 22, accumulation of data does not occur in the small base station 20.

However, some other cases are also expected, in which the small base station is installed not only in public area such as the foregoing cell of macro base station or pico base station but also in a user's private home. In these cases, as shown in FIG. 11, a low-speed link such as an ADSL (Asymmetric Digital Subscriber Line), etc. may be used as the backhaul link 26 of the small base station.

For example, in the communication system in FIG. 11, in a downlink (DL) data communication toward the mobile equipment 10, the communication speed of backhaul link 26 is, for example, 10 Mbps, which is lower than a downlink (DL) communication speed (for example, 75 Mbps) of the radio transmission path 22. When using the low speed link as the backhaul link of the small base station in this way, there is a fear that a wasteful use of radio resources occurs in the radio transmission path 22. If the radio resources are used wastefully, it becomes easy to occur interference of DL/UP to a mobile station in a cell (radio communication area) of neighboring-base station.

Furthermore, in the uplink (UL) data communication from the mobile equipment 10, the communication speed of backhaul link 26 is, for example, 7 Mbps, which is lower than the uplink (UL) communication speed (for example, 37 Mbps) of the radio transmission path 22. When using the low speed link as the backhaul link 26 of the small base station 20 in this way, there is a fear that a buffer overflow of uplink data occurs at the small base station 20 side.

Solution to Problem

A base station apparatus according to an aspect of the present invention, which is a base station apparatus capable of communicating with a mobile station via a radio transmission path, comprises information acquisition means of acquiring information on a communication speed of a backhaul link of the base station apparatus, and parameter adjustment means of adjusting communication parameters of the radio transmission path so that a communication speed of the radio transmission path becomes equal to or lower than the communication speed of the backhaul link, based on the information on communication speed of the backhaul link acquired by the information acquisition means and a channel bandwidth of the radio transmission path.

In the foregoing base station apparatus, the parameter adjustment means may acquire information on link quality between the base station and the mobile station, select an MCS index that is equal to or smaller than an MCS index showing an MCS (Modulation Coding Scheme) corresponding to the acquired link quality, select a maximum value of TBS (Transport Block Size) by which the communication speed of the radio transmission path is equal to or lower than the communication speed of the backhaul link, based on a correspondence data showing a corresponding relationship between a TBS index showing the TBS, a value of TBS and the number of PRBs (Physical Resource Blocks), and a TBS index corresponding to the selected MCS index, an RBG (Resource Block Group) size and the information on communication speed of the backhaul link, and determine an MCS index and the number of PRBs corresponding to the selected maximum value of TBS as an MCS index and the number of PRBs that are used for a communication with the mobile station via the radio transmission path.

Furthermore, in the foregoing base station apparatus, the parameter adjustment means may select TBS (Transport Block Size) candidates by which the communication speed of the radio transmission path is equal to or lower than the communication speed of the backhaul link, based on the TBS corresponding to the selected MCS index, and select a maximum value of the TBS candidates corresponding to the PRB (Physical Resource Block) that is an integral multiple of the RBG (Resource Block Group) according to the channel bandwidth of the radio transmission path, from selected TBS candidates.

Moreover, in the foregoing base station apparatus, the parameter adjustment means may adjust the communication parameter of the radio transmission path so that the communication speed of the radio transmission path becomes equal to or lower than a value obtained by multiplying the communication speed of the backhaul link by a correction coefficient C (0<C≤1).

A base station apparatus according to another aspect of the present invention, which is a base station apparatus capable of communicating with a mobile station via a radio transmission path, comprises information acquisition means of acquiring information on a communication speed of a backhaul link of the base station apparatus, and parameter adjustment means of adjusting a communication parameter of the radio transmission path so that a communication speed of the radio transmission path becomes equal to or lower than a value obtained by multiplying the communication speed of the backhaul link by a correction coefficient C (0<C≤1), based on the information on the communication speed of the backhaul link acquired by the information acquisition means.

In any one of the foregoing base station apparatuses, the information acquisition means may periodically acquire the information on the communication speed of the backhaul link, and the parameter adjustment means may perform the adjustment of the communication parameter of the radio transmission path when the communication speed of the backhaul link becomes equal to or lower than a predetermined threshold.

Furthermore, in any one of the foregoing base station apparatuses, the base station apparatus may be configured so as to be capable of spatially multiplexing in the radio transmission path, and the parameter adjustment means may adjust so as not to perform the spatial multiplexing in a downlink of the radio transmission path.

Moreover, in any one of the foregoing base station apparatuses, the base station apparatus may be configured so as to be capable of selecting two or more kinds of modulation and coding schemes in the radio transmission path, and the parameter adjustment means may adjust so as to change a modulation and coding scheme in the radio transmission path to a modulation and coding scheme corresponding to slow speed.

Further, in any one of the foregoing base station apparatuses, the information acquisition means may acquire the information on the communication speed of the backhaul link from server apparatus.

A communication system according to an aspect of the present invention comprises the foregoing base station apparatus, and a server apparatus of measuring communication speed of the backhaul line in the base station apparatus, which is located in a core network side.

Advantageous Effects of Invention

According to the present invention, it is capable of performing an appropriate communication with a mobile station in accordance with a communication speed of backhaul link.

BRIEF DESCRIPTION OF DRAWINGS

FIG. 9 is an illustration showing one example of determination procedures of the number of physical resource blocks (PRBs) and an MCS index in the adjustment of communication parameters in FIG. 8.

FIG. 12A illustrates a CQI table of mutually corresponding data showing a relationship between CQI indexes, modulation systems, and coded rates.

FIG. 12B illustrates an MCS table of mutually corresponding data showing a relationship between MCS indexes showing modulation and coding schemes.

FIG. 12C illustrates a TBS table of mutually corresponding data showing a relationship between transport block size (TBS) indexes, and the numbers of PRBs.

FIG. 12D illustrates a table of mutually corresponding data showing a relationship between channel bandwidths [MHz] of the radio transmission path and resource block group sizes [PRB].

FIG. 12E illustrates an MCS table of mutually corresponding data showing a relationship between MCS indexes showing modulation and coding schemes (MCS) in case of uplink, the modulation systems, and the transport block size (TBS: Transport Block Size) indexes.

FIG. 12F illustrates a TBS table of mutually corresponding data showing a relationship between transport block size (TBS) indexes and the numbers of PRB.

DESCRIPTION OF EMBODIMENTS

Hereinafter, embodiments of the present invention are described with reference to the drawings.

Figure 1:
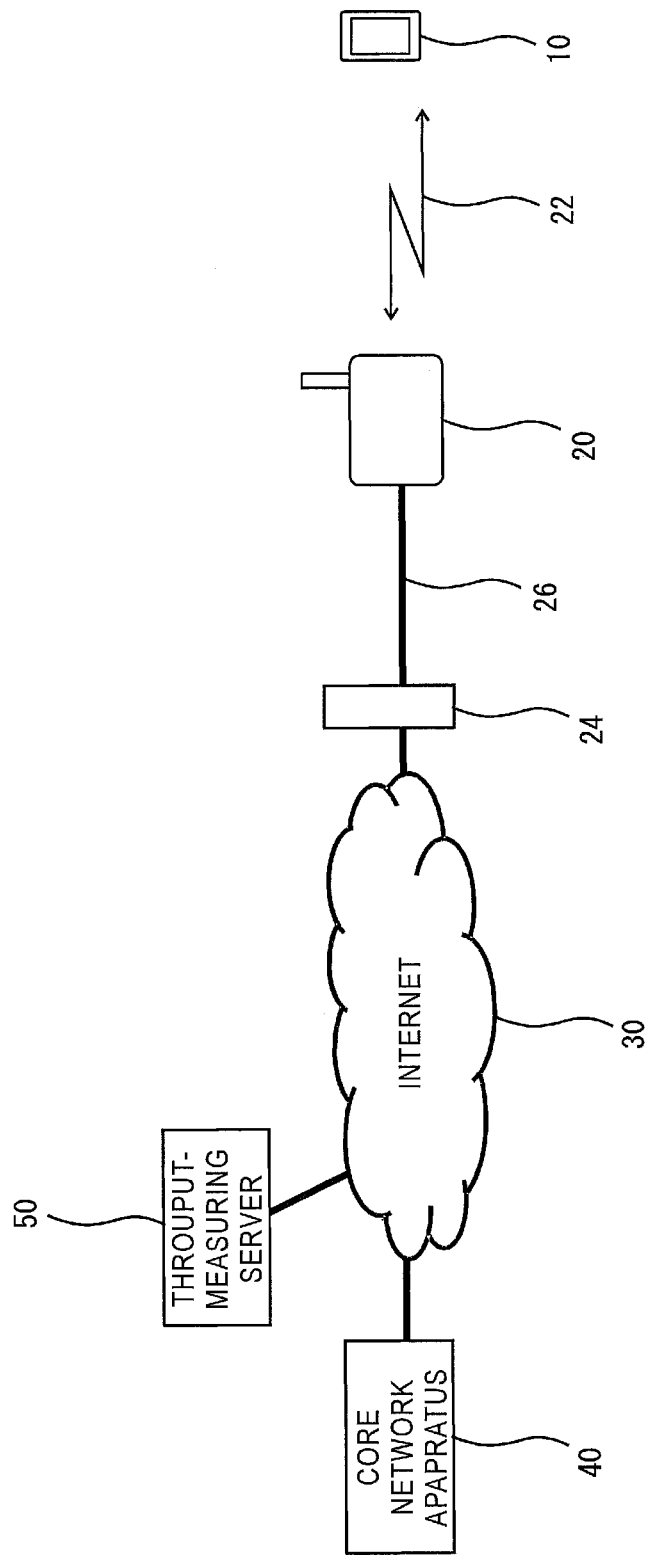
FIG. 1 is an illustration showing one example of schematic configuration of a communication system according to an embodiment of the present invention.

FIG. 1 is an illustration showing one example of schematic configuration of communication system according to an embodiment of the present invention. In FIG. 1, the communication system of this embodiment is a communication system based on the specification of LTE (Long Term Evolution), and includes a small base station capable of communicating with mobile equipment 10 being as a mobile station via a radio transmission path 22. The communication system according to an embodiment is also provided with a throughput-measuring server 50 that measures a communication speed of a backhaul link 26 of the small base station 20, in addition to the various types of core network apparatus 40. It is noted that, although one mobile equipment 10 and one small base station 20 are shown in FIG. 1, the number of mobile equipment 10 and the number of small base station 20 may be plural, respectively.

The small base station 20, which is different from a wide-area macro base station, is a small capacity base station capable of being installed indoor such as in a private house, shop, office or the like, and has a radio-communication range between about few meters and about several hundred meters. Since the small base station 20 is installed so as to cover an area smaller than an area covered with a wide-area base station in the mobile communication network, the small base station 20 is sometimes called as a "femto base station" or sometimes called as a "Home e-Node B" or "Home eNB". The small base station 20 is connected with a core network of the mobile communication network via a backhaul link 26 such as a broad-band public communication link such as an ADSL line or an optical communication line or the like, a router 24 provided midway of the backhaul link 26, the Internet 30, and is configured to be capable of communicating with each of the various types of core network apparatus 40 and the throughput-measuring server 50 by a predetermined communication interface.

The mobile equipment 10 is user equipment (UE) consisting of a communication terminal such as a cellular phone or smart phone, and when being located in the cell of the small base station 20, it is capable of performing a communication with the small base station corresponding to the serving cell by using a predetermined communication method and a radio resource. The mobile equipment 10 is configured with, for example, hardware such as a computer device having a CPU, memories, etc., a radio communication section and so on, and is capable of performing a radio communication with the base station 20, etc. and the like, by executing a predetermined program.

The throughput-measuring server 50 is configured with, for example, hardware such as a computer device having a CPU, memories, etc., an external communication interface section for the core network. The throughput-measuring server 50 measures a communication speed of the backhaul link 26 of the small base station 20, by executing a predetermined program. For example, the throughput-measuring server 50 performs a communication with the small base station 20 via the backhaul link 26 in a predetermined timing (for example, at fixed intervals), and measures a communication speed of each downlink (DL) toward the small base station side and uplink (UP) toward core network side of the backhaul link 26. These measurement results are stored in a predetermined storage device in the throughput-measuring server 50. Furthermore, the throughput-measuring server 50 transmits information on the measurement results of the communication speed of the backhaul link 26 to the small base station 20, in response to the acquisition request received from the small base station 20.

Figure 2:
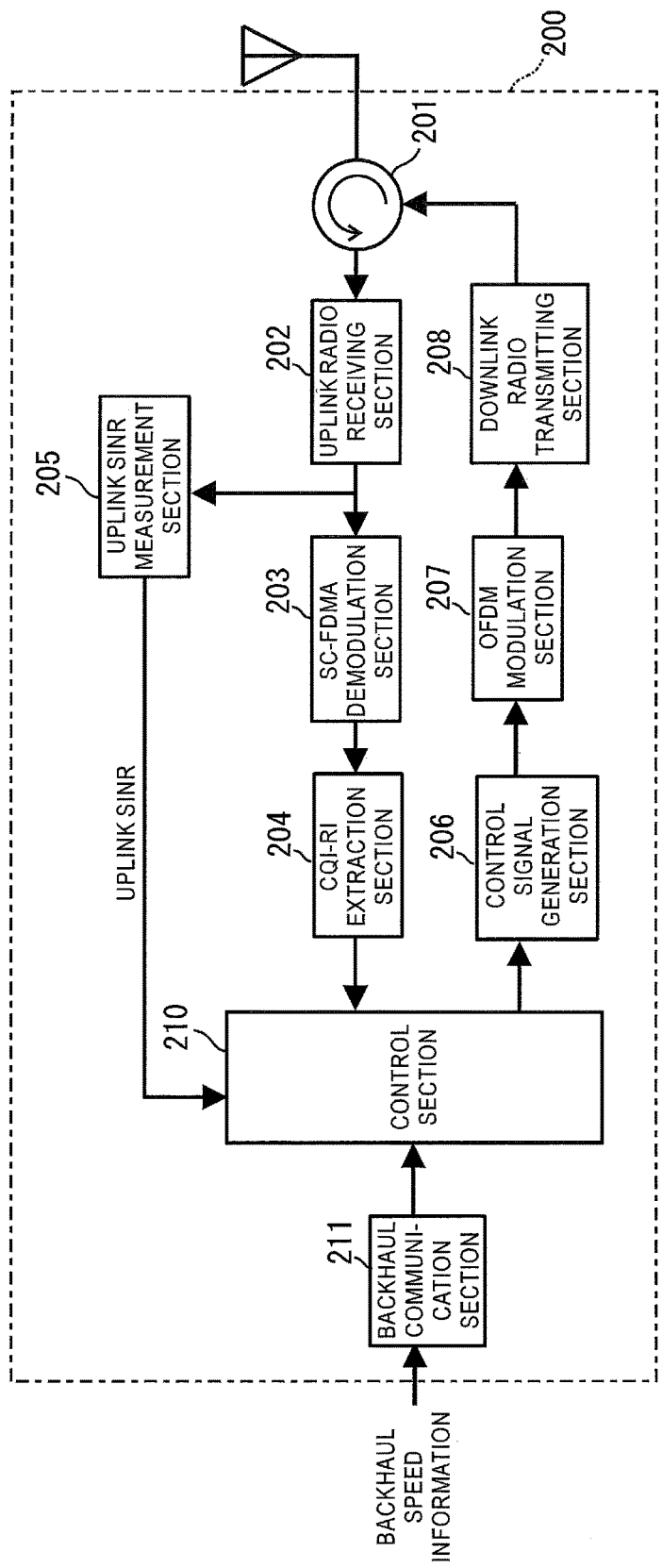
FIG. 2 is a function block diagram showing an example of schematic configuration of a main part of a base station apparatus forming a small base station according to the present embodiment.

FIG. 2 is a function block diagram showing an example of schematic configuration of a main part of a base station apparatus 200 forming a small base station 20 according to the present embodiment. The base station apparatus 200 is configured with, for example, hardware such as a computer device having a CPU, memories, etc., an external communication interface section for the core network, a radio communication section and so on, and is capable of performing a process described below acquiring information on the communication speed of the backhaul link 26, and performing a process of adjusting the communication parameter of the radio transmission path between the own base station and the mobile equipment 10, by executing a predetermined program.

In FIG. 2, the base station apparatus 200 is provided with a transmission and reception sharing device (DUP: Duplexer) 201, an uplink radio receiving section 202, a SC-FDMA (Single-Carrier Frequency-Division Multiple Access) demodulation section 203, a CQI·RI extraction section 204 and an uplink SINR measurement section 205. The base station apparatus 200 is also provided with a control signal generation section 206, an OFDM (Orthogonal Frequency Division Multiplexing) demodulation section 207, a downlink radio transmitting section 208, a control section 210 and a backhaul communication section 211. The base station apparatus 200 is configured with hardware such as a computer device having a CPU, RAM, ROM, etc., a high frequency circuit apparatus and so on. It is noted that the base station apparatus 200 may include an antenna.

The uplink radio receiving section 202 receives a radio signal modulated with a SC-FDMA system for uplink specified by the LTE from the mobile equipment 10 via an antenna and the transmission and reception sharing device 201.

The SC-FDMA demodulation section 203 acquires a reception data by demodulating the radio signal modulated with the SC-FDMA system.

The CQI·RI extraction section 204 extracts channel quality information (CQI: Channel Quality Indicator) such as downlink communication quality information, and rank information (RI: Rank Indicator) with respect to the appropriate transmitting layer number, from the reception data demodulated by the SC-FDMA demodulation section 203.

The uplink SINR measurement section 205 measures a signal to interference plus noise ratio (SINR: Signal to Interference plus Noise Ratio) of the a desired wave-to-interference wave such as an uplink communication quality information based on the reference signal (DMRS: Demodulation Reference Signal, SRS: Sounding Reference Signal) received at the uplink radio receiving section 202, and passes those measurement results of the SINR to the control section 210.

Furthermore, the control signal generation section 206 generates a physical downlink control information (PDCCH) being as a control signal including a downlink control information (DCI: Downlink Control Information), based on the information on the communication parameter determined by the control section 210.

The OFDM modulation section 207 modulates the downlink data such as a physical downlink control information (PDCCH) received by the control signal generation section 206, a physical shared channel (PUSCH) and so on, with the OFDM system so that the downlink data is transmitted with a predetermined power.

The downlink radio transmitting section 208 transmits the transmission signal modulated by the OFDM modulation section 207 via the transmission and reception sharing device 201 and the antenna.

The control section 210, which, for example, is configured with a computer device, controls each section and is capable of performing various kinds of processes, by executing a predetermined program to be read.

Moreover, the control section 210 functions as information reception means of receiving a communication speed of the backhaul link 26 from the throughput-measuring server 50, collaborate with a backhaul communication section 211.

Figure 3A:
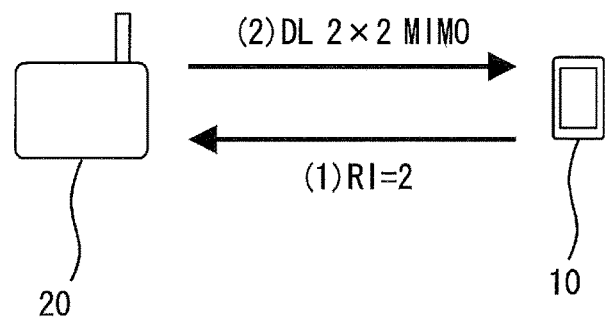
FIG. 3A is an illustration showing one example of normal determination procedures for determining downlink communication parameters (the number of spatial multiplexing, modulation system, bandwidth) in the radio transmission path of the communication system according to the present embodiment.
Figure 3B:
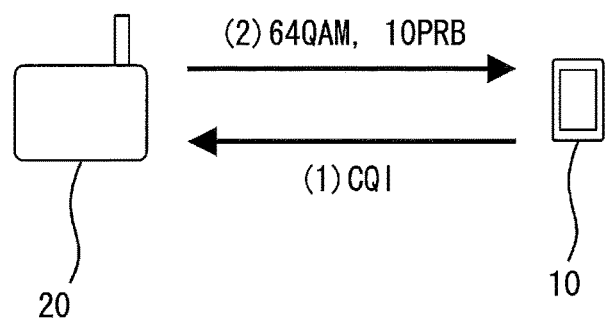
FIG. 3B is an illustration showing another example of normal determination procedures for determining downlink communication parameters (the number of spatial multiplexing, modulation system, bandwidth) in the radio transmission path of the communication system according to the present embodiment.

FIG. 3A and FIG. 3B are respectively a illustration showing one example of normal determination procedures for determining downlink communication parameters (the number of spatial multiplexing, modulation system, bandwidth) in the radio transmission path 22 of the communication system according to the present embodiment. In the description herein, a communication speed (transmission speed) in the downlink is determined by the number of spatial multiplexing of the MIMO (Multiple-Input and Multiple-Output), the modulation system, and the bandwidth in the radio transmission path 22.

In the example in FIG. 3A, first, as shown in the procedure (1), the mobile equipment 10 determines whether the spatial multiplexing of the MIMO can be received or not, based on the downlink communication speed from the base station 20 or the condition of the radio transmission path 22, and reports the determined result such as a rank information (RI) with respect to the number of the transmission layers to the small base station 20. In the description herein, when RI=1, the RI means that it is not capable of receiving with the spatial multiplexing by the MIMO, and when RI=2, the RI means that it is capable of receiving with the spatial multiplexing by 2×2 of the MIMO.

Then, as shown in the procedure (2), the small base station 20 determines whether the transmission with spatial multiplexing by the MIMO is performed or not, based on the RI received from the mobile equipment 10.

Next, the small base station 20 transmits a downlink data signal to the mobile equipment 10, in accordance with the foregoing determined result of the number of spatial multiplexing by the MIMO, modulation system, and PRB number, etc.

In the example in FIG. 3B, first, as shown in the procedure (1), the mobile equipment 10 reports downlink communication quality from the small base station 20 as a CQI (Channel Quality Indicator) to the small base station 20.

Then, as shown in the procedure (2), the small base station 20 determines a downlink modulation system and the number of physical resource blocks (PRB: Physical Resource Block) corresponding to the bandwidth, based on the CQI received from the mobile equipment 10, a data rate required for realizing QoS (Quality of Service), a scheduling, the number of mobile equipment, and so on.

Nest, the small base station 20 transmits downlink data signals to the mobile equipment 10, in accordance with the foregoing determined modulation system and the number of PRBs, etc.

Figure 4:
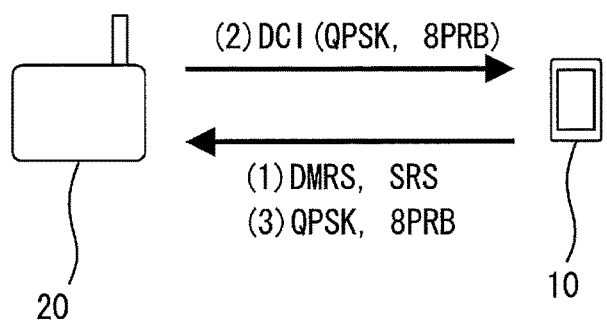
FIG. 4 is an illustration showing one example of normal determination procedures for determining uplink communication parameters (modulation system, bandwidth) in the radio transmission path of the communication system according to the present embodiment.

FIG. 4 is an illustration showing one example of normal determination procedure for determining uplink communication parameters (modulation system, bandwidth) in the radio transmission path 22 of the communication system according to the present embodiment. In the description herein, an uplink communication speed (transmission speed) is determined by the modulation system and the bandwidth in the radio transmission path 22.

In the example in FIG. 4, first, as shown in the procedure (1), the small base station 20 measures an uplink SINR (Signal to Interference plus Noise Ratio), based on the reference signal (DMRS: Demodulation Reference Signal, SRS: Sounding Reference Signal) transmitted from the mobile equipment 10.

Then, as shown in the procedure (2), the small base station 20 determines the uplink modulation system and the number of physical resource blocks (PRB: Physical Resource Block) corresponding to the bandwidth, based on the uplink SINR, a data rate required for realizing the QoS, a scheduling, the number of mobile equipment, and so on, and indicates them to the mobile equipment 10 as DCI (Downlink Control Information).

Next, as shown in the procedure (3), the mobile equipment 10 transmits uplink data signals, in accordance with the modulation system and the number of PRBs, etc. indicated from the small base station 20 by the DCI.

Figure 5:
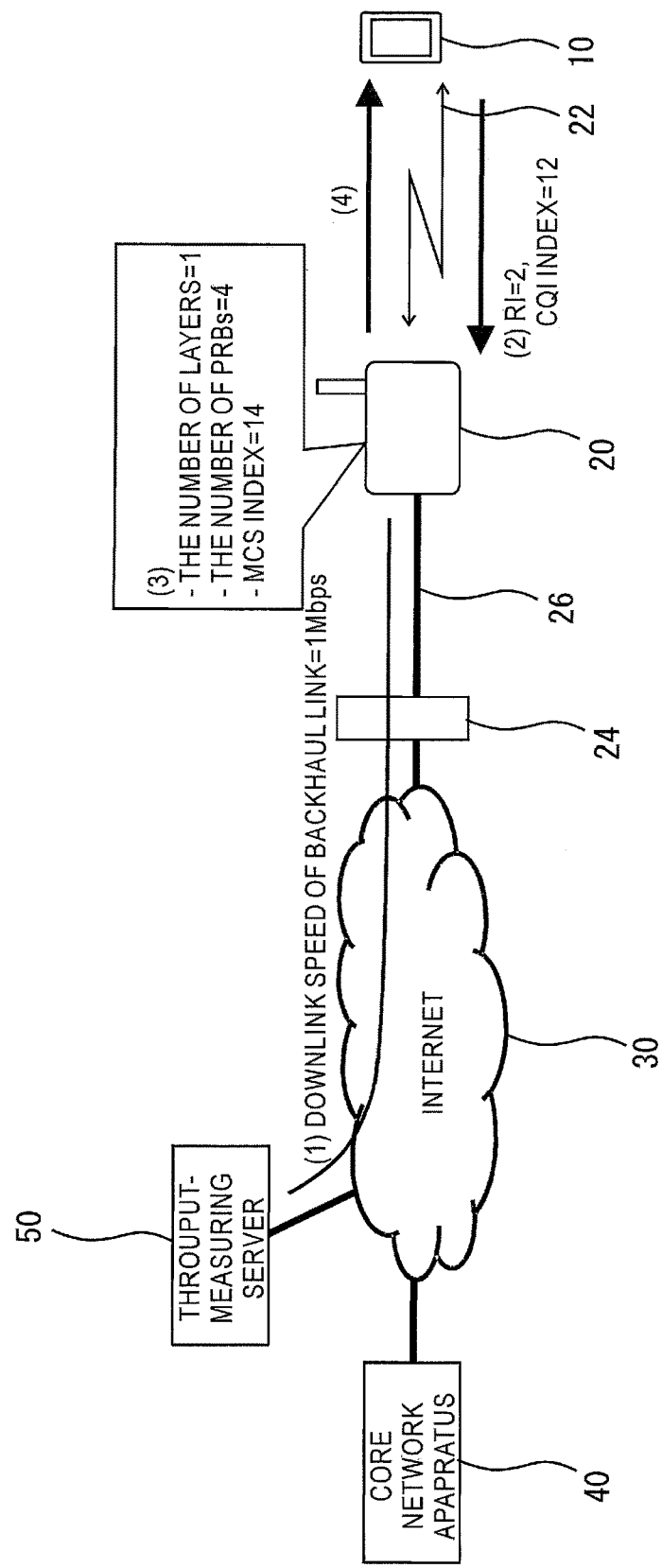
FIG. 5 is an illustration showing one example of adjustment procedures for adjusting downlink communication parameters of the radio transmission path in the communication system according to the present embodiment.

FIG. 5 is an illustration showing one example of adjustment procedure of adjusting downlink communication parameters of the radio transmission path 22 in case that the backhaul link 26 is low speed in the communication system according to the present embodiment. It is noted that, in FIG. 5, the downlink (DL) communication speed of the radio transmission path 22 before adjusting the communication parameter is 75 Mbps.

In FIG. 5, first, as shown in the procedure (1), the small base station 20 is periodically connected with the throughput-measuring server 50, and acquires information on the downlink speed (in the example of the figure, 1 Mbps) of the backhaul link 26.

Then, as shown in the procedure (2) in FIG. 5, the mobile equipment 10 periodically measures downlink quality, and reports a CQI index and RI as a result of measurement to the small base station 20. Herein, as an example, CQI index=12 and RI=2 are assumed to be reported.

Next, as shown in the procedure (3) in FIG. 5, the small base station 20 adjusts communication parameters of the radio transmission path 22 for the mobile equipment 10, for example, as shown below, based on the information on downlink speed of the backhaul link 26 acquired in the procedure (1) and the information on downlink quality received from the mobile equipment 10 in the procedure (2).

Table 1 shown in FIG. 12A is one example of a CQI table of mutually corresponding data showing a relationship between CQI indexes, modulation systems, and coded rates. According to this table 1, since the mobile equipment 10 requires the modulation system of 64 QAM and the coded rate of 666/1024=0.65, because reporting the CQI index=12.

Furthermore, Table 2 in FIG. 12B is one example of a MCS table of mutually corresponding data showing a relationship between MCS indexes showing modulation and coding schemes (MCS: Modulation and Coding Scheme) in case of downlink, modulation systems, and transport block size (TBS: Transport Block Size) indexes. Herein, the transport block size (TBS) is the number of bits capable of transmitting within 1 transmission time interval (TTI: Transmission Time Interval)=1 msec. Table 3 of FIG. 12C is one example of a TBS table of mutually corresponding data showing a relationship between transport block size (TBS) indexes, and the numbers of PRBs. Furthermore, Table 4 of FIG. 12D is a one example of table of mutually corresponding data showing a relationship between channel bandwidths [MHz] of the radio transmission path and resource block group (RBG: Resource Block Group) sizees [PRB].

The RBG in Table 4 is defined to reduce overhead of a physical downlink control channel (PDCCH: Physical Downlink Control Channel). Although the PDCCH is a channel attaching to a shared channel for transmitting downlink data, it is desirable to lower the size as much as possible, because there is no case that a downlink data is superimposed on the PDCCH itself.

Figures 6, 7:
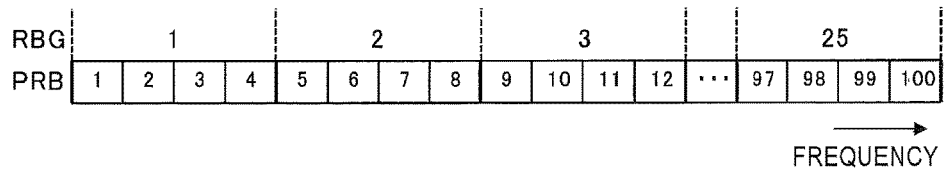
FIG. 6 is an illustration showing one example of a resource block group (RBG).
FIG. 7 is an illustration showing one example of determination procedures of the number of physical resource blocks (PRBs) and an MCS index in the adjustment of communication parameters in FIG. 5.

FIG. 6 is an illustration showing one example of RBG. The example of FIG. 6 is an example in case that the RGB size is 4 PRB. Herein, showing an example in which the channel bandwidth is 20 MHz (100 PRB), in case that there is not a concept corresponding to the RBG, that is, in case that a radio resource of the PDSCH is allocated by 1 PRB unit, the amount of control information showing the mapping of the PRB becomes 100 bit. On the other hand, in case of adopting the concept corresponding to the RBG, since the RBG size is 4 PRB from Table 4, that is, in case that a radio resource of the PDSCH is allocated by a unit of 4 PRB, the required amount of control information becomes 100/4=25 bit. In other words, by adopting the concept corresponding to the RBG, although a granularity of allocation becomes coarse, it is capable of allocating the radio resource of PDSCH by about a quarter of the number of bits.

In the example of FIG. 5, using the foregoing Table 2, Table 3 and Table 4, for example, the number of MIMO layers (the number of spatial multiplexing), the modulation coding scheme (MCS) and the physical resource block (PRB), which are the downlink communication parameters, are adjusted as shown in the following (3A) to (3C).

(3A) Since the communication speed of the backhaul link 26 is equal to or lower than a predetermined threshold (for example 5 Mbps), the small base station 20 ignores RI=2 in the report from the mobile equipment 10, and determines the number of MIMO layers=1. At the same time, the small base station 20 selects an MCS that is almost equal to or lower than the MCS (MCS requested by the mobile equipment) in case of CQI index=12 in Table 1, from Table 2. For example, 16 QAM is selected.

(3B) Then, TBS candidates are selected from Table 3, by which a communication speed of the radio transmission path 22 is equal to or lower than the backhaul link speed, based on the TBS index (=9-15) corresponding to the foregoing selected MCS. Since the backhaul link speed is 1 Mbps in this example, the TBS candidates less than TBS=1000 is selected. For example, in the example of Table 3, the TBS candidates are selected, by which the TBS index is within a range from 9 to 15 (within thick line in Table 3) and the TBS is equal to or smaller than 1000.

(3C) Next, TBS candidates are selected from the TBS candidates selected in the foregoing (3B), which belong to only the column of the number of PRBs that are integral multiple of the RBG size corresponding to the channel bandwidth of the radio transmission path 22. Herein, by the Table 4, the RBG size is 4 PRG because the channel bandwidth is 20 Mbps, and then, five TBS candidates (616, 680, 776, 904, 1000) are selected from the TBS candidates selected in the foregoing (3), which belong to the column of the number of PRBs of 4.

After that, the maximum TBS is selected from the TBS candidates remained in the foregoing (3C). In the example of FIG. 7, TBS=1000 is selected. The number of PRBs and the MCS index corresponding to this maximum TBS are to be the final selected number of PRBs and MCS index. In the example of FIG. 7, the final number of PRB is 4 and the MCS index is 14.

By the above-described adjustment of the communication parameters, the downlink communication parameters of the radio transmission path 22 are determined as follows:

the number of MIMO layers: 1 (=transmission diversity), the number of PRBs: 4,

MCS index: 14 (=16 QAM).

It is noted that, in case of the foregoing determined communication parameters, the downlink communication speed (throughput) of the radio transmission path 22 is to be 1000 (bit)×1000 (TTI/sec)=1 [Mbps].

Then, as shown in the procedure (4) in FIG. 5, the small base station 20 transmits downlink data to the mobile equipment 10, in accordance with the foregoing communication parameters after adjusting.

As described above, by adjusting the downlink communication parameters in the radio transmission path 22 shown in FIG. 5, it is capable of using the radio resource of the radio transmission path 22 effectively, and reducing interference to the mobile equipment 10 in a peripheral radio communication area (cell). Especially, in the example of FIG. 5, the communication parameters of the radio transmission path 22 are adjusted by considering not only the information on communication speed of the backhaul link 26 but also the channel bandwidth of the radio transmission path 22. Consequently, it is capable of surely realizing the effective utilization of the radio resource of the radio transmission path 22 and the reduction of interference to the mobile equipment 10 in the peripheral radio communication area (cell), without being affected by the channel bandwidth of the radio transmission path 22.

Figure 8:
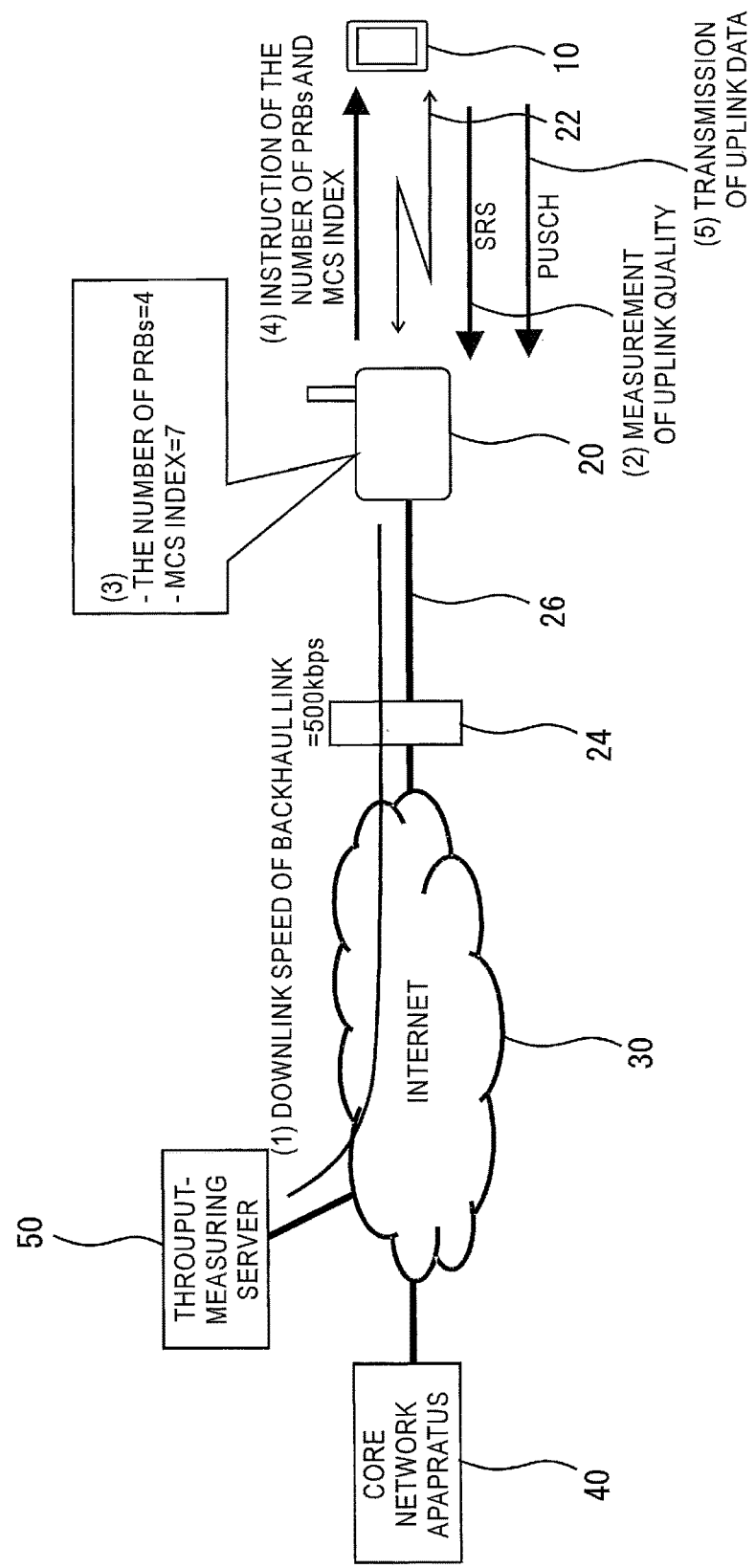
FIG. 8 is an illustration showing one example of adjustment procedures for adjusting uplink communication parameters of the radio transmission path in case that the backhaul link is low speed in the communication system according to the present embodiment.
Figure 10:
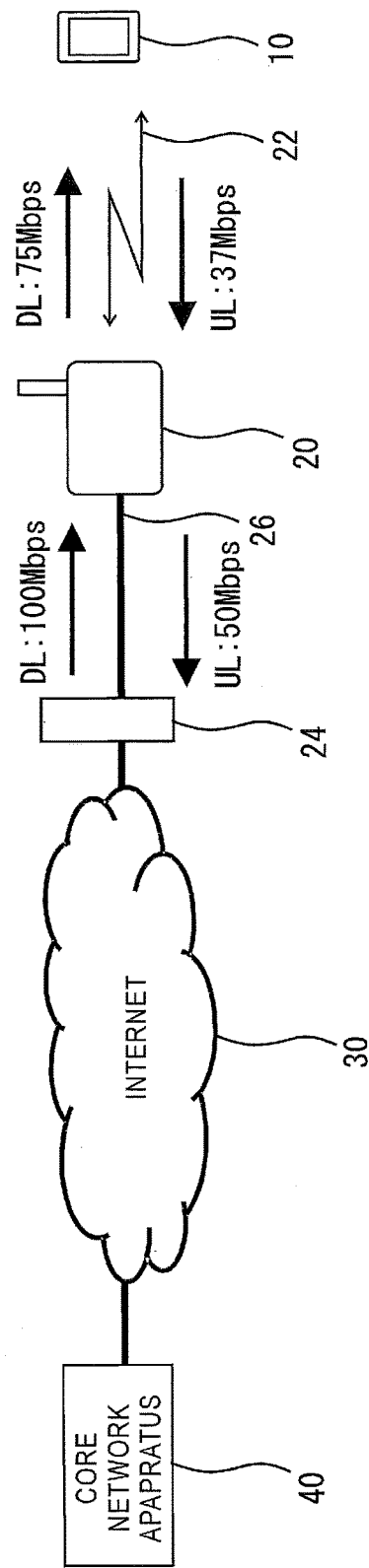
FIG. 10 is an illustration showing a schematic configuration of communication system including a small base station and a high-speed backhaul link according to a conventional example.
Figure 11:
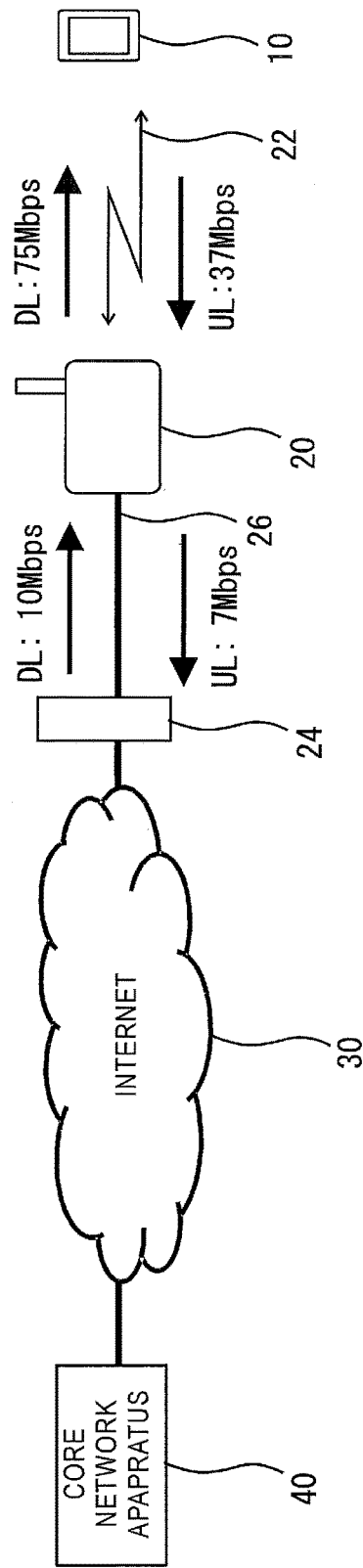
FIG. 11 is an illustration showing a schematic configuration of communication system including a small base station and a low-speed backhaul link according to a conventional example.

FIG. 8 is an illustration showing one example of adjustment procedures for adjusting uplink communication parameters of the radio transmission path 22 in case that the backhaul link 26 is low speed in the communication system according to the present embodiment. It is noted that, in FIG. 8, the uplink (UL) communication speed of the radio transmission path 22 before adjusting the communication parameters is 37 Mbps.

In FIG. 8, first, as shown in the procedure (1), the small base station 20 is periodically connected with the throughput-measuring server 50, and acquires information on uplink speed (in the example of the figure, 500 Mbps) of the backhaul link 26.

Then, as shown in the procedure (2) in FIG. 8, the small base station 20 periodically measures the uplink SINR (Signal to Interference plus Noise Ratio) as uplink quality, based on the signals (for example, SRS) that are periodically transmitted from the mobile equipment 10.

Next, as shown in the procedure (3) in FIG. 3, the small base station 20 adjusts communication parameters of the radio transmission path 22 for the mobile equipment 10, for example, as shown below, based on the information on uplink speed of the backhaul link 26 acquired in the procedure (1) and the information on uplink quality measured in the procedure (2).

Table 5 of FIG. 12E is one example of an MCS table of mutually corresponding data showing a relationship between MCS indexes showing modulation and coding schemes (MCS) in case of uplink, the modulation systems, and the transport block size (TBS: Transport Block Size) indexes. Furthermore, Table 6 of FIG. 12F is a one example of a TBS table of mutually corresponding data showing a relationship between transport block size (TBS) indexes and the numbers of PRB.

Using the foregoing Table 5 and Table 6, for example, the modulation coding scheme (MCS) and physical resource block (PRB), which are the uplink communication parameters, are adjusted as shown in the following (3A)~(3C).

(3A) Since the communication speed of the backhaul link 26 is equal to or lower than a threshold (for example 5 Mbps), the small base station 20 selects MCSs lower than the optimal MCS based on the measurement result of uplink quality measured with the mobile equipment 10 in the radio transmission path 22, from Table 5. For example, QPSK is selected.

(3B) Then, TBS candidates are selected from Table 6, by which the communication speed of the radio transmission path 22 is equal to or lower than the backhaul link speed, based on the TBS indexes (=0-10) corresponding to the foregoing selected MCSs. Because the backhaul link speed is 500 kbps in this example, the TBS candidates equal to or lower than TBS=500 are selected. For example, in the example of Table 6, the TBS candidates are selected by which the TBS index is within the range from 0 to 10 (within thick line in Table 6) and less than TBS=500.

(3C) Next, the maximum TBS is selected from the TBS candidates selected in the forgoing (3B). In the example of FIG. 9, TBS=472 is selected. The number of PRBs number and the MCS index corresponding to the maximum TBS are to be the final selected number of PRBs and MCS index. In the example of FIG. 9, the final number of PRBs is 4 and the MCS index is 7.

By the above-described adjustment of the communication parameter, the uplink communication parameters of the radio transmission path 22 are determined as follows:
the number of PRBs: 4
MCS index: 7 (=QPSK)

It is noted that, in case of the foregoing determined communication parameters, the uplink communication speed (throughput) of the radio transmission path 22 is to be 472 (bit)×1000 (TTI/sec)=472 [kbps].

Then, as shown in the procedure (4) in FIG. 8, the small base station 20 indicates the foregoing number of PRBs and the MCS index after adjusting to the mobile equipment 10.

Then, as shown in the procedure (5) in FIG. 8, the mobile equipment 10 transmits uplink data, in accordance with the indication received from the small base station 20 in the foregoing procedure (4).

the communication parameters of the radio transmission path 22 may be adjusted so that the communication speed of the radio transmission path 22 is equal to or lower than a value obtained by multiplying the communication speed of the backhaul link 26 by a correction coefficient C. By using the correction coefficient C in this way, it is capable of ensuring a band for maintaining communication services, and preventing a congestion of the backhaul link more surely.

For example, the communication parameters of the radio transmission path 22 may be adjusted so that the downlink communication speed (throughput) of the radio transmission path 22 is equal to or lower than a value obtained by multiplying the downlink communication speed of the backhaul link 26 by a correction coefficient C. Moreover, the communication parameters of the radio transmission path 22 may be adjusted so that the uplink communication speed (throughput) of the radio transmission path 22 is equal or lower than a value obtained by multiplying the uplink communication speed of the backhaul link 26 by a correction coefficient C. That is to say, in each of the aforementioned embodiments, the target throughput of the downlink/uplink of the radio transmission path 22 may be a value obtained by multiplying the downlink/uplink communication speed of the backhaul link 26 by a correction coefficient C. The correction coefficient C, for example, is a value within a range satisfying $0 < C \leq 1$.

Moreover, the foregoing correction coefficient C may be set based on an identifier (QCI: QoS Class Identifier) of the communication service quality via the radio transmission path 22 by the mobile equipment 10. For example, as shown in Table 7, the foregoing correction coefficient C may be set corresponding to the QCI (QoS Class Identifier) showing QoS (Quality of service) of the communication service of each mobile equipment 10

TABLE 7

| QCI | Resource Type | Priority | Allowable Delay Time | Allowable Packet Loss Rate | Correction Coefficient C | Examples of Communication Services |
|---|---|---|---|---|---|---|
| 1 | GBR | 2 | 100 ms | $10^{-2}$ | 0.9 | Conversational Voice |
| 2 | | 4 | 150 ms | $10^{-3}$ | 0.9 | Conversational Video (Live Streaming) |
| 3 | | 3 | 50 ms | $10^{-3}$ | 0.9 | Real Time Gaming |
| 4 | | 5 | 300 ms | $10^{-6}$ | 0.8 | Non-Conversational Video (Buffered Streaming) |
| 5 | Non-GBR | 1 | 100 ms | $10^{-6}$ | 0.7 | IMS Signalling |
| 6 | | 6 | 300 ms | $10^{-6}$ | 0.6 | Video (Buffered Streaming) TCP-based (e.g., www, e-mail, chat, ftp, p2p file sharing, progressive video, etc.) |
| 7 | | 7 | 100 ms | $10^{-3}$ | 0.6 | Voice, Video (Live Streaming) Interactive Gaming |
| 8 | | 8 | 300 ms | $10^{-6}$ | 0.5 | Video (Buffered Streaming) |
| 9 | | 9 | | | | TCP-based (e.g., www, e-mail, chat, ftp, p2p file sharing, progressive video, etc.) |

As described above, by adjusting the uplink communication parameters in the radio transmission path 22 as shown in FIG. 8, it is capable of eliminating data accumulation in the small base station 20, and preventing a buffer overflow of uplink data.

It is noted that, although the communication parameters of the radio transmission path 22 is adjusted so that the communication speed (throughput) of the radio transmission path 22 is equal to or lower than the communication speed of the backhaul link 26 in the aforementioned embodiments, For example, in Table 7, QCI=1 shows a voice service. In this representative example is a VoLTE (Voice over LTE), although the maximum speed of voice codec is 23.85 kbps even with a high quality standard of AMR-WB (Adaptive Multi-Rate Wide Band), the bandwidth guarantee (GBR: Guaranteed Bit Rate) for maintaining communication service is required. In this case, the foregoing correction coefficient C may be set to a large value (for example, 0.9) so as to more surely preventing congestion of the backhaul link.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10 mobile equipment (mobile station, user equipment, MUE)
20 small base station
22 radio transmission path
24 router
26 backhaul link
30 internet
40 core-network apparatus
50 throughput-measuring server

The invention claimed is:

1. A base station apparatus capable of communicating with a mobile station via a radio transmission path, the base station apparatus comprising:
information acquisition means for acquiring information on a communication speed of a backhaul link of the base station apparatus, and
parameter adjustment means for adjusting a communication parameter of the radio transmission path so that a communication speed of the radio transmission path becomes equal to or lower than the communication speed of the backhaul link, based on the information on communication speed of the backhaul link acquired by the information acquisition means and a channel bandwidth of the radio transmission path, wherein the parameter adjustment means acquires information on link quality between the base station and the mobile station, selects an MCS index that is equal to or smaller than an MCS index showing an MCS (Modulation Coding Scheme) corresponding to the acquired link quality, selects a range of TBS (Transport Block Size) candidates by which the communication speed of the radio transmission path is equal to or lower than the communication speed of the backhaul link, based on TBS indexes corresponding to the selected MCS index, and selects a maximum value of the TBS candidates corresponding to the PRB (Physical Resource Block) that is an integral multiple of the RBG (Resource Block Group) according to the channel bandwidth of the radio transmission path, from the range of selected TBS candidates, in a correspondence data showing a corresponding relationship between a TBS index showing the TBS, a value of TBS and the number of PRBs, and determines an MCS index and the number of PRBs corresponding to the selected maximum value of TBS, as an MCS index and the number of PRBs that are used for a communication with the mobile station via the radio transmission path.

2. The base station apparatus according to claim 1, wherein the parameter adjustment means adjusts the communication parameter of the radio transmission path so that the communication speed of the radio transmission path becomes equal to or lower than a value obtained by multiplying the communication speed of the backhaul link by a correction coefficient C.

3. The base station apparatus according to claim 2, wherein the correction coefficient C is a value within a range satisfying $0 < C \leq 1$.

4. The base station apparatus according to claim 2, wherein the correction coefficient C is set based on an identifier of quality of communication service via the radio transmission path.

5. The base station apparatus according to claim 1, wherein the information acquisition means periodically acquires the information on the communication speed of the backhaul link, and
the parameter adjustment means performs the adjustment of the communication parameter of the radio transmission path when the communication speed of the backhaul link becomes equal to or lower than a predetermined threshold.

6. The base station apparatus according to claim 1, wherein the base station apparatus is configured so as to be capable of spatially multiplexing in the radio transmission path, and
the parameter adjustment means adjusts so as not to perform the spatial multiplexing in a downlink of the radio transmission path.

7. The base station apparatus according to claim 1, wherein the base station apparatus is configured so as to be capable of selecting two or more kinds of modulation and coding schemes in the radio transmission path, and
the parameter adjustment means adjusts so as to change a modulation and coding scheme in the radio transmission path to a modulation and coding scheme corresponding to slow speed.

8. The base station apparatus according to claim 1, wherein the information acquisition means acquires the information on the communication speed of the backhaul link from a server apparatus.

9. A communication system comprising:
a base station apparatus according to claim 8; and
a server apparatus of measuring a communication speed of a backhaul link of the base station apparatus, the server apparatus being located in a core network side.

* * * * *